United States Patent [19]

Wolf et al.

[11] Patent Number: 4,458,888
[45] Date of Patent: Jul. 10, 1984

[54] DAMPENING DEVICE

[75] Inventors: Franz J. Wolf, Bad Soden-Salmünster; Hubert Pletsch, Birkenau, both of Fed. Rep. of Germany

[73] Assignee: WOCO Franz-Josef Wolf & Co., Bad Soden-Salmünster, Fed. Rep. of Germany

[21] Appl. No.: 347,230

[22] Filed: Feb. 9, 1982

[30] Foreign Application Priority Data

Feb. 10, 1981 [DE] Fed. Rep. of Germany ....... 3104708

[51] Int. Cl.³ .............................................. F16F 9/10
[52] U.S. Cl. .................................. 267/140.1; 267/153; 267/141
[58] Field of Search ..................... 267/140.1, 141, 153, 267/63 R, 63 A; 188/298; 248/636, 562; 277/212 FB

[56] References Cited

U.S. PATENT DOCUMENTS

| | | | |
|---|---|---|---|
| 2,387,065 | 10/1945 | Harding | 188/298 |
| 3,737,605 | 6/1973 | Tobey et al. | 277/212 FB |
| 3,888,449 | 6/1975 | Jablonski et al. | 267/140.1 |
| 4,262,886 | 4/1981 | Le Salver et al. | 267/141 |

Primary Examiner—Bruce H. Stoner, Jr.
Assistant Examiner—Alvin Oberley
Attorney, Agent, or Firm—Jordan and Hamburg

[57] ABSTRACT

A damper for dampening shock and vibration between two structural members includes a housing secured to one of the structural members and a flexible membrane body secured to the other. The flexible membrane body defines at least parts of three hydraulic chambers which are hydraulically interconnected through hydraulic passages, whereby dampening between the two structural members is effected flexibly by the membrane body and hydraulically by the fluid in the hydraulically interconnected chambers.

10 Claims, 4 Drawing Figures

DAMPENING DEVICE

BACKGROUND OF THE INVENTION

This invention relates to a three-chambered damper for dampening shock and vibration.

Dampers for dampening shock and vibration between two structural parts limitedly movable against each other are generally formed of elastomers. Elastomer dampers have the advantage that they are inexpensive to manufacture, are immune to corrosion, resistant to wear and tear, and thus are of great durability. However, one disadvantage of such elastomer dampers for a series of applications is the expansion-contraction characteristics inherent to most elastomers which, upon manufacture of the dampening device in a size feasible from the point of view of economy and construction, results in a dampening characteristic which is too soft and a movement which is too great, especially on shock or sudden loading.

Thus an object of the present invention is to provide a damper whose dampening characteristic is similar to that of an elastomer damper but, in contrast to the characteristics of an elastomer damper, can be adjusted or set with simple means, especially for proportional or over-proportional dampening.

In order to obtain this objective, the present invention provides for a three-chambered damper which, in substance, consists of a housing to which one of the two structural members to be dampened is secured, an elastic membrane body being arranged in the housing which is open on one side or is at least provided with a large opening, the elastic membrane body defining in the housing a hydraulically closed system of three chambers which are connected to each other hydraulically through a throttle or dampening passages or openings. The second of the structural members to be dampened relative to the first is secured to the membrane body, wherein this connection grips inside the dampening housing through the open side of the damper housing.

By selecting the size of the three hydraulic chambers as well as their arrangement and providing suitable dimensions and arrangement for the throttle system which connects the three chambers hydraulically among themselves into a cohesive system, it is possible to set up any desired number of dampening characteristics.

The damper housing preferably is made of steel, particularly a steel header that is closed by a sealing cover on one side. The membrane body of an elastomer has in the center thereof a non-deformable connecting block element for connecting thereto the second structural member. Preferably, this connecting block is also made of steel. The securement of such connecting block into the elastomer membrane body is preferably accomplished by vulcanizing the connecting block onto the membrane body.

The membrane body is dimensioned in such a way that its elastic dampening characteristic markedly contributes to the overall dampening characteristics of the three-chambered damper. In other words, the three-chambered damper should preferably not merely be formed as a hydraulic damper, but as a combination damper comprising a hydraulic dampening system and a flexible-elastic or rubber-elastic damper. The flexible-elastic or rubber-elastic dampening characteristic of the membrane body contribute all the more to the overall dampening characteristics as does the membrane walls and the size of the cross-sections of the throttling channels that connect the three hydraulic chambers with each other.

When the membrane body is provided with a connecting block, the throttle channels are formed as bores or passages in the connecting block. This ensures that the throttling channels will not be deformed even at the highest shock load of the damper. Thus they do not change their cross-section and thereby cannot change the dampening characteristic of the dampening device without control. The three chambers that are hydraulically connected to each other are preferably arranged in such a way that one chamber lies over the contact point of the structural member, the second hydraulic chamber lies below such contact point, and the third chamber is arranged symmetrically to the first two chambers in front of the connection of this structural member that grips from the outside into the housing. With such a relatively simple chamber arrangement, optimal three-dimensional dampening can be achieved.

The throttling channel system may, in another embodiment of the three-chambered damper, be replaced by throttling means which establish connection of the fluid between the individual chambers through a central chamber. Preferably, this other type of hydraulical connection between the chambers is obtained by providing a recess in the one frontal part of the connecting block that borders on the chamber which recess represents an extension of the hydraulic chamber. In this case the frontal part of the connecting block is not covered by the elastic membrane body. Rather, this advantageous embodiment of the membrane body is formed with a traversing opening that extends through the middle of the membrane body, the connecting block being vulcanized onto such opening.

The recess formed on the frontal part of the connecting block and into it, which represents the extended part of a hydraulic chamber, is vulcanized onto the membrane body in the manner of an annular reinforcement. In the part that encircles the frontal recess of the connecting block each hydraulic chamber is radially arranged to extend outwardly, and there is provided a traversing channel which aligns with openings in the chambers disposed thereabout. The channel that ends in the extended part of the chamber may, on the one hand, be provided in the vicinity of the bottom surface of the recess wherein the bottom area then constitutes a one-sided channel. In another embodiment these channels may, however, be displaced in relation to the frontal surface edge and have a larger distance to the bottom of the recess than to the surface border. In the latter case, the dampening characteristic of the three-chambered damper is influenced by stronger hydraulic whirling currents in the extended part.

The formation of the channel that ends in the frontal recess of the connecting block and, thereby, of the corresponding opening to the hydraulic chambers is preferably formed on diametrically opposite sides of the recess. When several channels or openings for a chamber are provided, then also a symmetrical or constitutionally provided displacement of these channels may be provided. As long as the action of the forces occurs from predetermined preferential directions and it has been decided to install a three-chambered damper, advantageous dampening characteristics may also be obtained with the displaced arrangement of two channels as contrasted to a diametrical arrangement.

Besides a radically displaced arrangement of the channels which end in the recess of the connecting block, displacement of the channels in the axial direction of the connecting block against each other may be selected to obtain the desired dampening characteristics. With the last mentioned displacement of the channels, which may also be combined with a corresponding axial length of the recess, it will be possible to obtain dampening in the enlarged range of the centrally provided hydraulical chamber without affecting the main area of this hydraulic chamber in any substantial way. The enlarged hydraulic chamber of the three-chambered damper forms what in principle is known as a mushroom form, wherein the capped upper part forms the main chamber and the stem forms the recess that continues in the connecting block. Changed dampening characteristics may, however, be obained by providing the channels that end in the enlarged portion with corresponding diameters and the aligned openings in the chambers. In another variant, the channels to be provided in the walls of a preferably cylindrical recess may also be formed in the direction of the major part of the hydraulic chamber, thus beyond the vertical line of the axis of the connecting block. Thereby the hydraulic medium would firstly be pressed in the direction to the main chamber, whereinanother, almost still volume of the hydraulic medium would be pushed into the complementary chamber.

The three-chambered dampening element of the present invention is preferably used in the automotive industry, namely as a dampening element for motor suspension.

The invention is described in more detail in relation to two illustrated embodiments.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
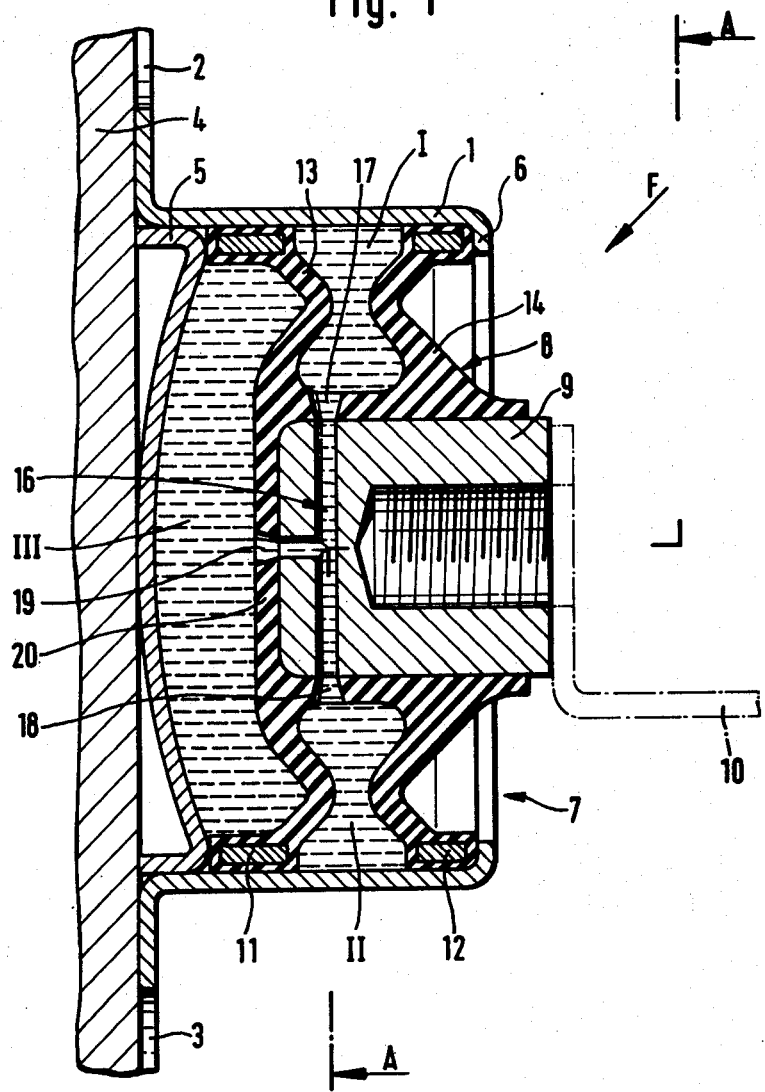
FIG. 1 is an axial cross-sectional view of a three-chambered damper according to one embodiment of the invention.

The three-chambered damper of the invention represented by a schematic axial cross section in FIG. 1 consists of a housing 1 which is tightly secured to a first structural member 4, for instance through bolts which pass through bore holes 2,3. The housing 1 preferably is made of steel and is formed as a header which on the bottom part is closed hydraulically by a cover insert 5 in a tight manner. The open side of the housing 1 extends radially inwardly as indicated at 6 so that housing 1 has a relatively large circular frontal open side 7.

A flexible membrane body 8 is arranged inside the housing 1, the membrane body 8 having approximately the form of a wheel provided with a rim. The middle part of the membrane body 8 is formed in the manner of a hub or boss into which a connecting block element 9 is secured. The block element 9 is vulcanized to the hub or boss of the membrane body 8 and may, for example, also be tightly connected through a screw connection with the block element 9. The block element 9 may also be made of steel. The schematically indicated second structural member 10 is affixed to the block element 9.

Steel rings 11,12 are vulcanized onto two circular outer borders of the rim-shaped membrane body 8. The rings 11,12 connect membrane body 8 in a fluid-tight manner with the inside wall of the housing 1. The hydraulically tight circular area that forms between the two circular sections 13,14 of the membrane body 8 is subdivided by a diagonal or separating membrane 15 (FIG. 2) into an upper first hydraulic chamber I and a lower second hydraulic chamber II. A third hydraulic chamber III is formed between the rear membrane 13 of the membrane body 8 and the cover 5 of housing 1.

The three hydraulic chambers I, II, III are connected among themselves by a T-shaped throttling-channel system 16 which in block element 9 has the form of passages and through openings 17, 18 and 19 in membrane body 8 opening into the chambers I, II resp. III.

Regarding the mode of operation, assuming that a shock force F acts in the direction of the arrow shown in FIG. 1 on the movable structural member 10 that lies opposite the rigid structural member 4. This force that acts on structural member 10 is transferred to the membrane body 8 through the block element 9 with a pressure force. The membrane body 8 is thereby deformed elastically in the direction of the acting force F, wherein the volume of the lower hydraulic chamber II and of the central hydraulic chamber III in the rear is reduced, while the volume of the upper hydraulic chamber I is increased. The hydraulic fluid pressed out of chambers II and III is throttled through the relatively narrow passages of the throttling channel system 16 into the hydraulic chamber I. The rubber-elastic dampening of force F by the membrane body 8 is thereby additionally hydraulically supported, and the rubber-elastic dampening of the membrane body 8 is thus hydraulically reinforced. The extent of reinforcement as well as space-wise distribution of such reinforcement can be established in a simple manner by providing suitable dimensions to the sections of the throttle channel system 16.

The hydraulic fluid employed as filler for the hydraulic dampening system consisting of the three hydraulic chambers I, II and III may, in principle, be of any desired kind and, preferably, a glycol mixture.

It will be noted that the throttling channel system need not necessarily be conducted through the block element 9. Rather, in the aforedescribed embodiment, a throttle opening may also be provided in the diagonal separating member 15 which connects chambers I and II directly to each other, while similar throttle openings may be provided in membrane 13 to establish a direct connection from chamber III to chamber I and/or to chamber II. In like manner, depending on the application, the arrangement and volume of the chambers may be varied.

Figure 2:
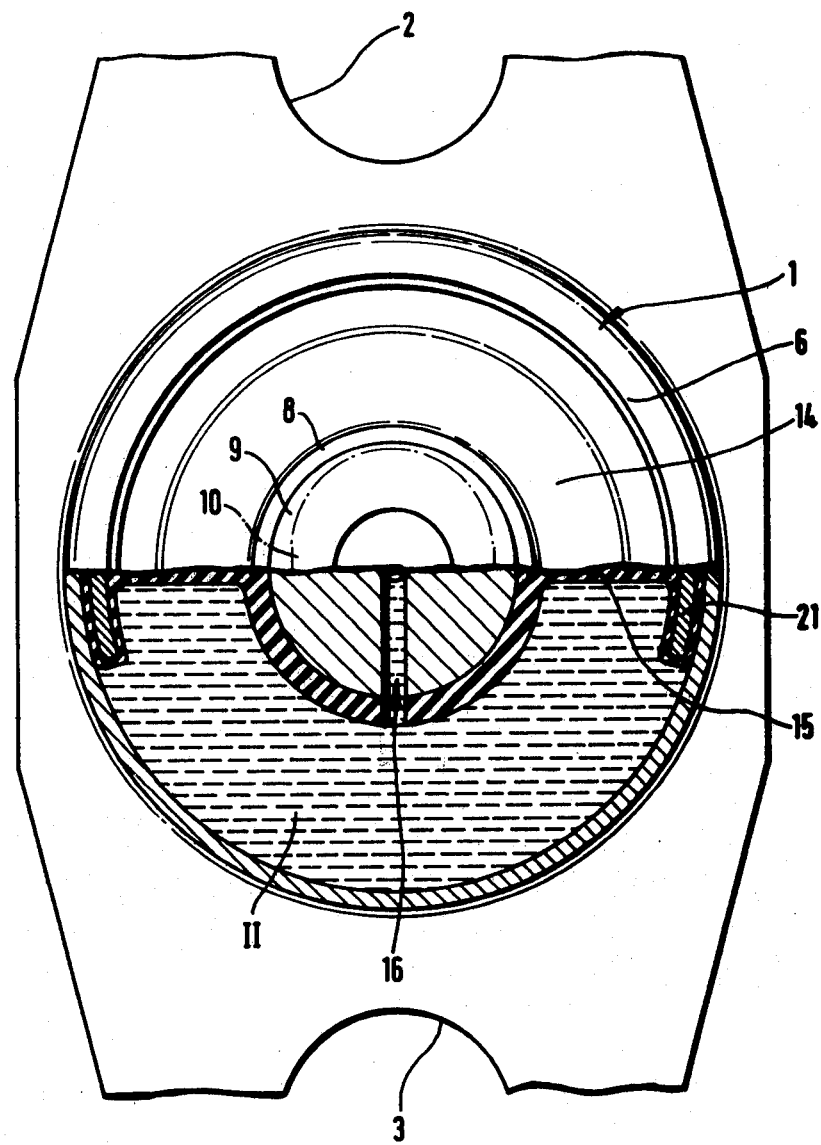
FIG. 2 is a cross-sectional view taken along line A—A in FIG. 1.
Figure 3:
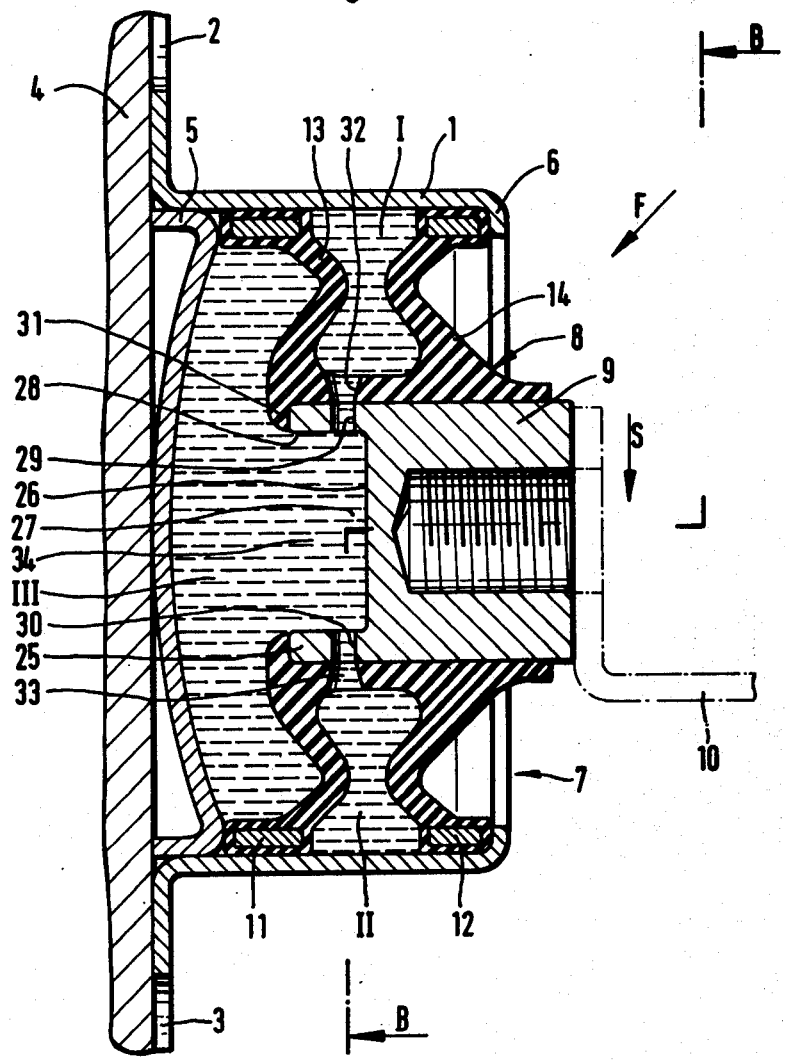
FIG. 3 is an axial cross-sectional view of a three-chambered damper according to another embodiment on the invention.
Figure 4:
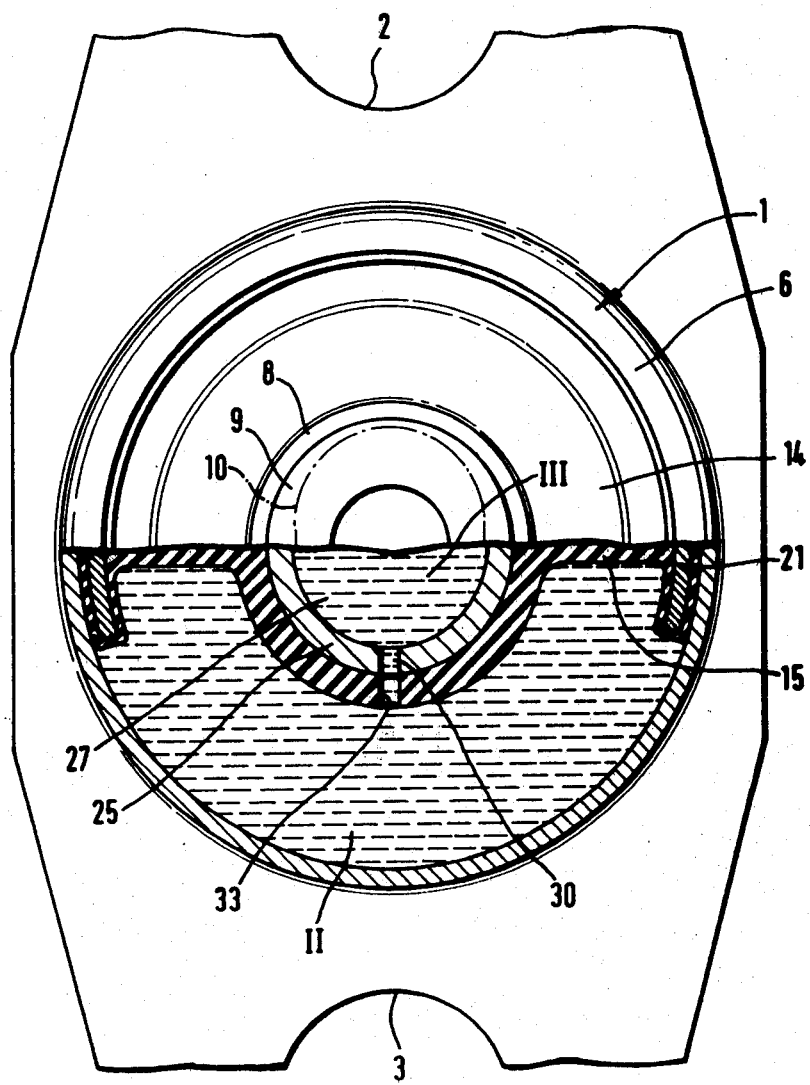
FIG. 4 is a cross-sectional view taken along line B—B in FIG. 3.

An example of another embodiment of a three-chambered damper is shown in FIGS. 3 and 4 and in substance is based on the same principle as the embodiment in FIGS. 1 and 2. In FIG. 3, the hydraulic chambers I and II are in like manner limited in the direction of the axis of block element 9 by sections 13 and 14 of membrane body 8. These sections 13 and 14 are formed in the middle area of the radial section of chambers I and II, the sections 13 and 14 extending towards each other so that the respective hydraulic chamber I or II is narrowed down in the middle. Chamber I or II, as the case may be, is limited radially outwardly by the inner wall of housing 1.

While in the example of the embodiment according to FIG. 1 the elastic membrane body 8 has a radially traversing closure wall 20 on the frontal side of the block element 9 that faces chamber III, such closure wall 20 is not provided in the embodiment according to FIG. 3. Contrary to the embodiment of FIG. 1, the block element 9 in FIG. 3 is provided with a recess 27 facing in the direction of hydraulic chamber III, the recess 27 having been made by boring or milling. This cylindrical recess 27 extends into the block element 9 so that openings 32 and 33 provided in chamber I and the complementary chamber II align themselves respectively with the preferably radially provided openings 29 and 30. Openings 29 and 30 are not, as in the embodiment illustrated in FIG. 1, in contact through a throttling channel system that traverses the block element 9, but rather they terminate at the section 34 of hydraulic chamber III which is formed by the recess 27.

In correspondence with the structure of the block element 9, the elastic membrane body according to FIG. 3 is to be understood to be arranged in the sense of a radial chamber mounted on a shaft, the shaft being formed by block element 9. Recess 27 on the frontal side of block element 9 is limited vis-a-vis the membrane body 8 and the hydraulic chamber III by a circular surface border 25. The cylindrical recess 27 is limited by a circular area 26 in the direction of the attachment area with the structural member 10. The openings 29 and 30 traversing the wall 28 of recess 27 are in fluid communication in a radially outward sense with hydraulic chambers I and II and in a radially inward sense with part 34 of chamber III. The frontal surface edge of block element 9 is encircled with reinforcement section 31 of membrane body 8. The reinforcement forms a circular area which, depending on the construction, may also reach into recess 27, for instance up to openings 29 and 30.

In the example of the embodiment illustrated in FIGS. 3 and 4, hydraulic chamber III, in substance, has a mushroom shape, wherein the mushroom cap of chamber II corresponds to FIG. 1 but which has been enlarged by the mushroom stem which protrudes into block element 9. The counter-area of hydraulic chamber III is formed by the slightly curved to the outside inner wall of cover 5 which may adjoin the structural member 4 in its middle area and its outer portions. The circular steel rings 11 and 12 of the three-chambered damper press the elastic membrane body 8 against the inner wall of housing 1 in a fluid-proof manner and are reinforced in the axial direction of the block element 9 by rod-formed diagonal connections 21 which are vulcanized into the area of the separating membrane 15.

The mode of operation of the three-chambered damper illustrated in the embodiment according to FIG. 3 will be described with the application of a force F acting vertically relative the axis of the block element 9. Force transfer takes place from structural member 10 to the block element 9 and, subsequently, to the elastic membrane body 8 and the hydraulic medium in chambers I, II and substantially in portion 34 of chamber III. While in the example of the embodiment of the three-chambered damper according to FIG. 1, the diametrically opposite arrangement of openings 17 and 19 of the hydraulic medium provide that the hydraulic medium from chamber II is pressed almost as a straight line stream through the throttling channel system 16 into chamber I and chamber III in FIG. 1 in such a case may be disregarded as regards dampening characteristics, on the other hand, in the example of the embodiment according to FIG. 3, portion 34 of chamber III is disposed in between.

The hydraulic medium repressed by force F acting in the direction of the arrow is expelled from the hydraulic chamber II through opening 33 and the passage 30 in block element 9 and is pressed against the hydraulic medium in the cylindrical area of portion 34 of chamber III. In the portion 34 a current whirling or eddying and dampening occurs, wherein volume repression through passage 29 and the therewith aligned opening 32 of hydraulic chamber I occurs only subsequently. In a similar manner as previously described, the forces in the F direction also experience a more favorable dampening characteristic since the additional surface area can, above all, transfer changes in forces to the hydraulic medium in chamber III along the area of the inner wall of the surface border 25.

What we claim is:

1. A damper for dampening shock and vibration between two structural members, comprising a housing secured to one of said two structural members, a flexible membrane body disposed in said housing, said membrane body defining at least parts of three hydraulic chambers which are hydraulically interconnected through hydraulic passage means, and securing means securing the other of said two structural members to said membrane body, said securing means comprising a non-flexible block element to which said other structural member is affixed, said membrane body having a central opening in which said block element is accommodated, said membrane body being constructed and arranged to define a first hydraulic chamber over said block element, a second hydraulic chamber below said block element, and a third hydraulic chamber on the front side of said block element opposite the side to which said other structure member is affixed, said hydraulic passage means comprising throttle channels in said block element which interconnect said three hydraulic chambers, said front side of said block element having a recess defining partially said third hydraulic chamber, said block element having an annular section defining said recess, said throttle channels comprising diametrically opposite openings in said annualar section communicating each of said first and second hydraulic chambers with said third chamber, whereby dampening between said two structural members is effected flexibly by said membrane body and hydraulically by fluid in said hydraulically interconnected chambers.

2. A damper according to claim 1 wherein said housing is open on the side which is connected to said one structural member, and a cover mounted in said open side of said housing and partially defining said third hydraulic chamber.

3. A damper according to claim 1 wherein said housing is open on the side connected to said other structural member with the securement of said other structural member to said membrane body being made through the last said opening in said housing.

4. A damper for dampening shock and vibration between two structural members, comprising a housing secured to one of said two structural members, a flexible membrane body disposed in said housing, said membrane body defining at least parts of three hydraulic chambers which are hydraulically interconnected through hydraulic passage means, and securing means securing the other of said two structural members to said membrane body, said securing means comprising a non-flexible block element to which said other structural member is affixed, said membrane body having a central opening in which said block element is accommodated, said membrane body being constructed and arranged to define a first hydraulic chamber over said block element, a second hydraulic chamber below said block element and a third hydraulic chamber on the first side of said block element opposite the side to which said other structural member is affixed, said hydraulic passage means comprising throttle channels in said block element which interconnect said three hydraulic chambers, said throttle channels comprising diametrically opposite channels in said block element communicating with each of said first and second hydraulic chambers respectively, said throttle channels further comprising an axial channel in said block element in communication with said diametrically opposite channels and with said third hydraulic chamber, whereby dampening between said two structural members is effected flexibly by said membrane body and hydraulically by fluid in said hydraulically interconnected chambers.

5. A damper according to claim 4 wherein said block element is vulcanized to said membrane body, said membrane body having a portion thereof extending over said front side of said block element, said membrane body portion defining a part of said third hydraulic chamber.

6. A damper according to claim 4 wherein said front side of said block element defines a part of said third hydraulic chamber.

7. A damper according to claim 1 wherein said housing is made of steel and said membrane body is made of an elastomer.

8. A damper according to claim 1 further comprising at least one metal ring urging said flexible membrane body against the wall of said housing in a fluid-tight manner.

9. A damper according to claim 1 wherein said dampening device is utilized for mounting a motor on a vehicle.

10. A damper according to claim 4 wherein said housing is open on the side which is connected to said one structural member, and a cover mounted in said open side of said housing and partially defining said third hydraulic chamber.

* * * * *